April 18, 1939. E. S. CORNELL, JR 2,155,079
METHOD OF MANUFACTURING WROUGHT NONFERROUS PIPE FITTINGS
Filed June 4, 1936 3 Sheets-Sheet 1
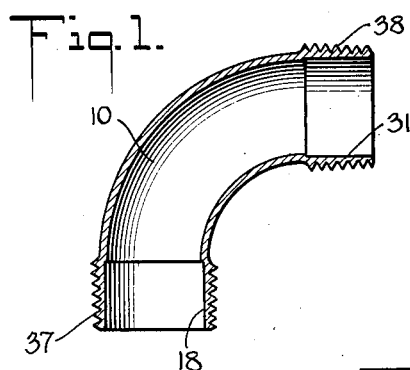
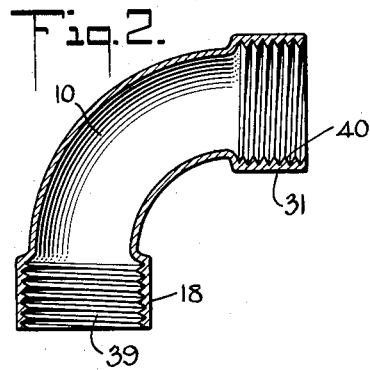
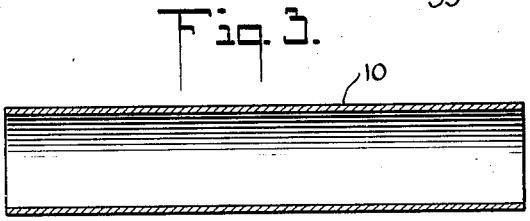
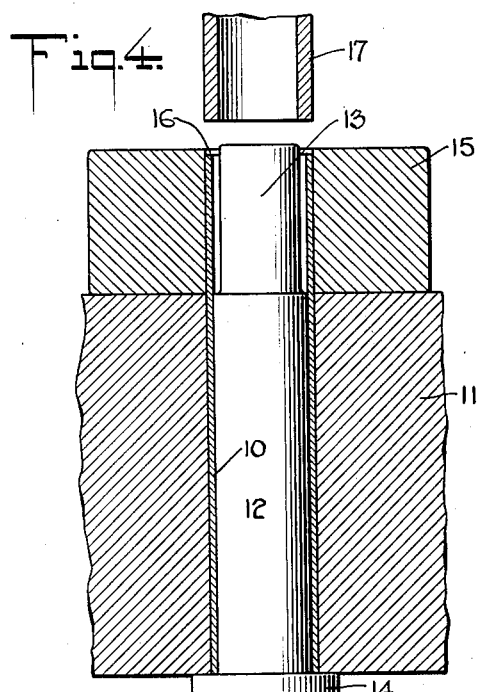
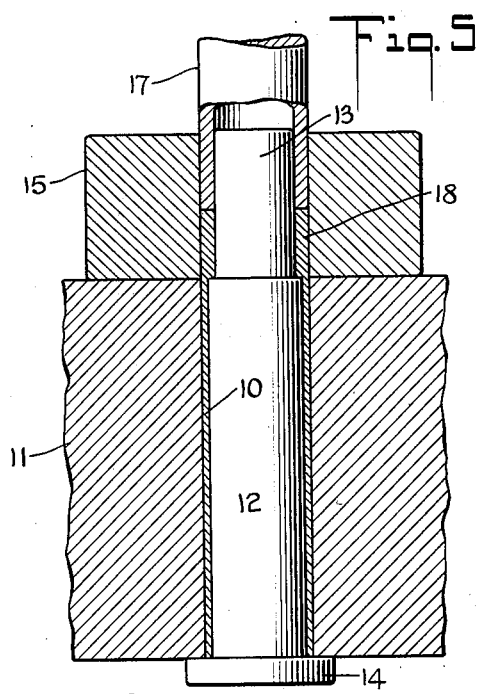
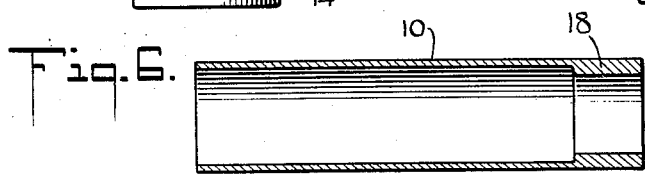
INVENTOR
Edward S. Cornell, Jr.
BY
HIS ATTORNEY April 18, 1939.  E. S. CORNELL, JR  2,155,079
METHOD OF MANUFACTURING WROUGHT NONFERROUS PIPE FITTINGS
Filed June 4, 1936   3 Sheets-Sheet 2
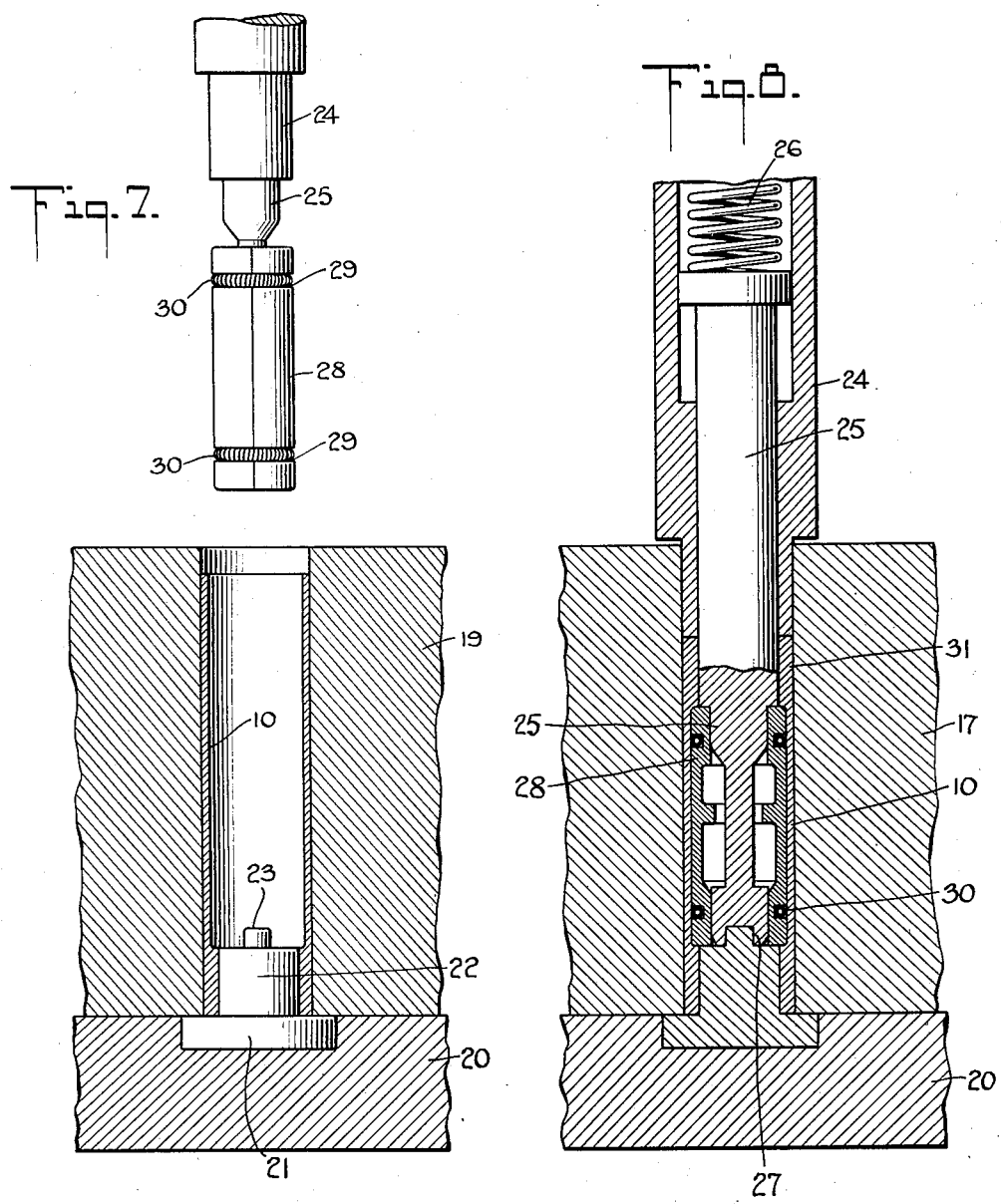
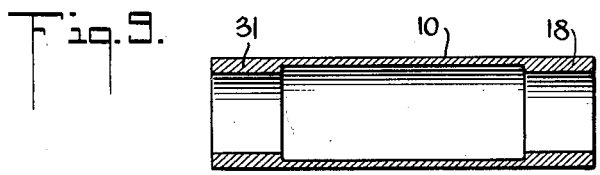
INVENTOR
Edward S. Cornell, Jr.
BY
HIS ATTORNEY April 18, 1939. E. S. CORNELL, JR 2,155,079
METHOD OF MANUFACTURING WROUGHT NONFERROUS PIPE FITTINGS
Filed June 4, 1936 3 Sheets-Sheet 3

INVENTOR
Edward S. Cornell, Jr.
BY
HIS ATTORNEY

Patented Apr. 18, 1939

2,155,079

UNITED STATES PATENT OFFICE 2,155,079

METHOD OF MANUFACTURING WROUGHT NONFERROUS PIPE FITTINGS

Edward S. Cornell, Jr., Larchmont, N. Y., assignor to American Radiator Company, New York, N. Y., a corporation of New Jersey Application June 4, 1936, Serial No. 83,417

2 Claims. (Cl. 29—157)

My present invention relates to pipe fittings, and more particularly to an improved method of manufacturing pipe fittings, such as elbows, from wrought non-ferrous metal having a body wall thickness insufficient to bear threads, and in which the resulting pipe fitting may be provided with threaded ends.

In my co-pending application Serial No. 755,567, filed December 1st, 1934, entitled "Method of manufacturing non-ferrous pipe fittings", I have described and claimed an improved method of manufacturing wrought non-ferrous metal pipe fittings, such as elbows. My present invention is directed generally to the method described and claimed in the application above identified, and is designed to reduce the number of operations on the tubular member when it is desired to make a pipe fitting, such as an elbow, having threads at both ends, and such threads may be either internally or externally forward at the ends of the pipe fitting.

Pursant to my present invention I utilize, as an element, an appropriate length of pipe preferably of non-ferrous metal, such as copper, and of a wall thickness insufficient to bear threads thereon, and subject the ends of the length of pipe to a thickening operation whereby the thickening operation produces a thickened end lying entirely within the original diameter of the pipe, and according to my present invention eliminates the step heretofore necessary of forming one of the thickened portions of one of the ends at the exterior of the pipe and afterwards forcing such thickened portion within the diameter of the pipe in order to accomplish the bending of the processed pipe into elbow form.

By this method of manufacture I am enabled to form the length of pipe into an elbow by passing the same through an arcuate passage formed in a die block. After the elbow forming operation I may expand the thickened ends of the elbow so as to provide exterior threads on such thickened ends, or by a further expansion provide threads on the interior of such thickened ends to enable the ends of a pipe or pipe fitting to be screw threadedly connected therewith and yet have the internal diameter of the elbow of substantially the same internal diameter as the end of the pipe or pipe fitting to be applied thereto.

A feature of my invention therefore is an improved method of making pipe fittings, such as elbows.

In the accompanying drawings illustrating the various steps of my improved method:

Fig. 1 is a sectional elevation of an elbow provided with exterior threads at each end.

Fig. 2 is a sectional elevation of an elbow provided with interior threads at each end.

Fig. 3 is a sectional elevation of a length of tube having a wall thickness insufficient to bear threads and which is utilized in practicing my improved method.

Fig. 4 is a sectional elevation through a die and plunger showing the first step in the method of thickening the ends of the tube or pipe shown in Fig. 3.

Fig. 5 is a sectional elevation similar to Fig. 4 and showing the position of the parts after the thickening operation has been performed.

Fig. 6 is a sectional elevation of the length of tube shown in Fig. 3 after completion of the thickening operation as illustrated in Fig. 5.

Fig. 7 is a sectional elevation of a die with the thickened ended pipe of Fig. 6 shown in position therein, and with the plunger shown in elevation, preparatory to thickening the other end of the tube.

Fig. 8 is a sectional elevation of the die and plunger shown in Fig. 7, and at the completion of the thickening operation at the other end of the tube.

Fig. 9 is a sectional elevation of the tube after the operation shown in Fig. 8, and illustrating the tube with both ends thickened, and with the thickened ends having an external diameter equal to the diameter of the tube shown in Fig. 3.

Figure 11:
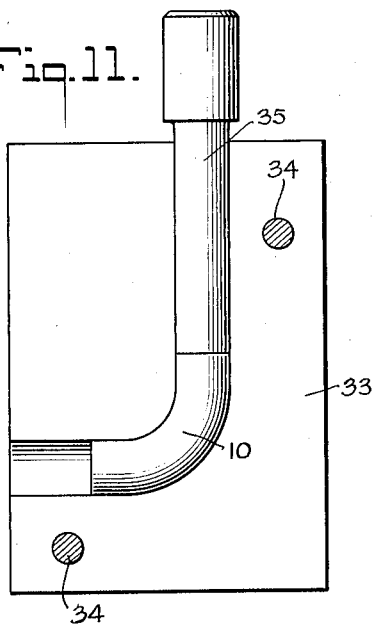
Fig. 11 is a view similar to Fig. 10 and showing the member illustrated in Fig. 9 after having been forced through the arcuate passage of the die.
Figure 12:
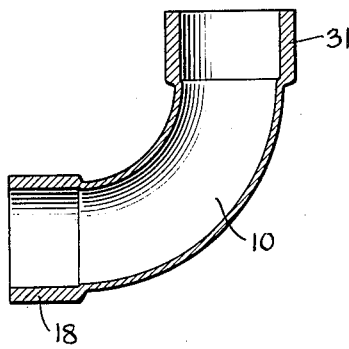
Figure 13:
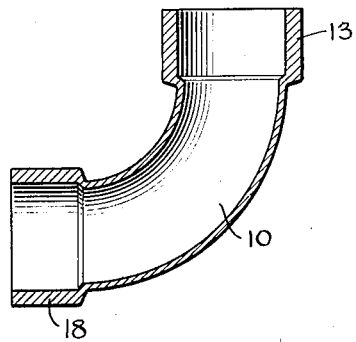

Fig. 12 is a sectional elevation of the elbow formed in Fig. 11 and after having the thickened ends thereof expanded to provide material for forming external threads thereon, and Fig. 13 is a sectional elevational of the elbow shown in Fig. 12 after the further expansion of the thickened ends to a degree to permit internal threads to be formed therein for the reception of a pipe end, or pipe fitting, and whereby the internal diameter of the elbow is substantially that of the internal end of the pipe fitting.

Referring to the drawings, there is shown in Fig. 3 a length of pipe 10 of wrought non-ferrous material, such as copper, having a wall thickness insufficient to bear threads and of a length suitable to manufacture therefrom a pipe fitting, such as an elbow. As a first step in my improved process of making from the length of tube or pipe 10, a pipe fitting to be provided preferably at both ends thereof with threads either internally or externally, I place such a length of tube in a cavity in a die block 11, see Fig. 4, one end of the tube extending upwardly beyond the upper limit of such die block 11. I then insert into the interior of such tube 10 a mandrel having a body 12 of substantially an internal diameter of the tube 10, a reduced upper end 13, and an enlarged lower end or head 14.

The length of the body portion 12, of the mandrel is substantially equal to the height of the die block 11 and the length of the reduced portion 13 is longer than the portion of the tube 10 which extends upwardly beyond the upper face of the die block 11. Resting on the upper face of the die block 11 is a collar 15, this collar being provided with a perforation 16 of a diameter substantially equal to the outer diameter of the tube 10. The thickness of the collar 15 is slightly greater than the length of the end of the tube 10, which extends above the upper face of the die block 11. A hollow punch 17 having an external diameter substantially equal to the diameter of the tube 10 or the diameter of the hole 16 in the collar 15, and an internal diameter but slightly greater than the external diameter of the reduced portion 13 of the mandrel, is carried by the ram or plunger (not shown) of a suitable punch press or equivalent machine.

The die block 11, the collar 15, and mandrel are placed in the position shown in Fig. 4, in such punch press or equivalent machine and the plunger 17 is forced downwardly into the annular space between the wall of the hollow 16 in the collar 15 and the reduced end 13 of the mandrel. Under pressure there is produced a cold flow of the homogeneous non-ferrous metal of the treated end of the tube 10 and when the plunger 17 reaches its lowermost position, as shown in Fig. 5, there is produced on the treated end of the tube 10 and on the interior thereof a thickened wall end 18, see Fig. 5. During this operation that portion of the tube 10 in the die block 11 and in engagement with the body 12 of the mandrel is protected against deformation.

The resultant construction, as a result of the first step of my improved method is a tube 10 of which one end is thickened, as indicated at 18 and in which the tube throughout its entire length, i. e. its body portion, is maintained of relatively constant diameter. Such tube in its now processed form is shown in sectional elevation in Fig. 6.

The tubular member 10, shown in Fig. 6, is now placed in a cavity in a die block 19, resting on a base 20. Recessed in the base 20 is an enlarged end 21 of a block which has a body portion 22 formed integral therewith and which extends upwardly into the cavity in the die block 19. The diameter of the body 22 is substantially equal to the internal diameter of the enlargement 18, on the end of the tube 10, and of a length substantially equal to the length of the said enlargement 18. Formed integral with the body 22 and extending upwardly therefrom is a cylindrical member 23. The position of the tubular member 10 with respect to the body 22 and with the die block 19 is clearly shown in Fig. 7.

The die block 19, with the tubular member 10 therein, is placed in a punch press, or equivalent machine, provided with a plunger or ram 24. This plunger or ram 24 is hollow and its lower end is reduced in diameter so as to have a diameter substantially equal to the diameter of the cavity in the die block 19. Slidably mounted in the plunger or ram 24 is an auxiliary ram 25, resiliently held in its lowermost position with respect to the ram or plunger 24 by a coil spring 26. The lower end of the auxiliary ram 25 is reduced in diameter and the lower end of the said auxiliary ram is provided with a recess 27 to receive the cylindrical projection 23, formed integral with the body 22, above described. Slidably mounted on the reduced end of the auxiliary ram 25 is a multi-part collapsible mandrel 28, the parts being provided, top and bottom, with grooves 29 and in each of these grooves is provided a helical spring 30, which serve to maintain the multi-part mandrel in assembled position and to assist in collapsing the mandrel when the reduced end of the auxiliary ram 25 has been moved longitudinally upward with respect to such multi-part mandrel 28, as viewed in Fig. 8.

The multi-part collapsible mandrel 28 is shown on the lower part of the auxiliary ram 25 associated with the ram or plunger 24 and when in this position the mandrel is collapsed by the springs 30 to its smallest diameter, i. e., substantially the diameter of the ram or plunger 24. When the ram or plunger 24, as shown in Fig. 7, is moved downwardly the collapsible mandrel 28 will rest on the upper end of the portion 22 of the block, and continued downward movement of the plunger 24 will permit the spring 26 to force the auxiliary ram 25 axially of the collapsible mandrel 28 thereby expanding such collapsible mandrel to a diameter substantially equal to the inner diameter of the tube 10 as shown in Fig. 8. When in this position the collapsible mandrel 28 supports the wall of the tube 10 against lateral deformation as the ram or plunger 24 subjects the end of the tube 10 to pressure. Also the upper end of the multi-part mandrel 28 provides a stop or limiting edge for the thickening of the now upper end of the tube 10. Therefore, when the tube 10 is subjected to the action of the ram or plunger 24 there is produced a cold flow of the metal in the upper end of the tube 10 to form the enlargement 31 at such upper end.

After the ram or plunger 24 reaches its lowermost position it will be started upward from the position shown in Fig. 8 and in such upward movement will move into engagement with the auxiliary ram 25. The auxiliary ram 25 will therefore move upward and the reduced lower end thereof will move axially with respect to the multi-part mandrel 28 sufficient to bring the multi-part mandrel 28 into position to permit the helical springs 30 to act thereon and collapse the multi-part mandrel sufficient to reduce the external diameter thereof to permit such mandrel to be withdrawn from the tube 10. The resultant product from this step in the operation of my improved method is shown in sectional elevation in Fig. 9.

Figure 10:
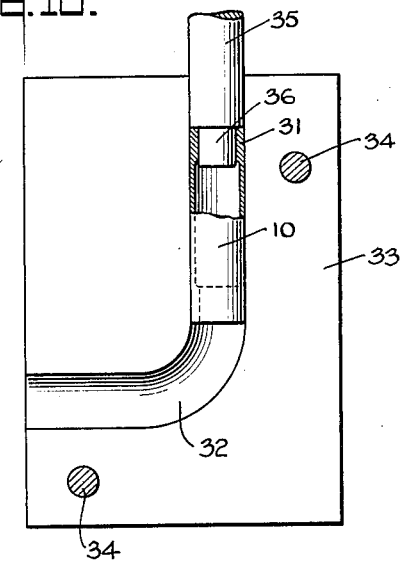
Fig. 10 is a plan view of one-half of a die block having an arcuate passage therein with the member shown in Fig. 9 in position therein and preparatory to forcing such member through the arcuate passage.

The thickened ended tube 10, shown in Fig. 9, is now placed in the arcuate passage 32 in a die block 33, as illustrated in Fig. 10. In such Fig. 10, but one half of the die block is shown, it being understood that another element of the die block 33 similar to that shown in Fig. 10, constitutes the entire die block, the elements being held in assembled position by bolts 34. Such die block 33 is placed in a punch press or equivalent machine provided with a ram or plunger 24

35 having a reduced end 36, of a diameter equal to the internal diameter of either the thickened end 18 or the thickened end 31 of the tube 10. Such plunger 35 is forced downwardly in the passage 32 from the position shown in Fig. 10 to the position shown in Fig. 11, thus forcing the tube 10 into the arcuate portion of such passage 32 and forming by such operation an elbow, as clearly shown in Fig. 11.

Such elbow may now by any suitable means have its thickened ends 18 and 31 expanded as shown in Fig. 12 to a degree where the internal diameter of such thickened ends is preferably slightly larger than the normal diameter of the tube 10. The expanded thickened ends 18 and 31 may now be externally threaded as shown in Fig. 1, such threaded portions being designated 37 and 38 respectively.

Should it be desired to produce an elbow having internal threads, the thickened ends 18 and 31 are further expanded from the size shown in Fig. 12 to that shown in Fig. 13 where it will be noted that the internal diameter of such thickened ends is considerably greater than the normal internal diameter of the tube 10. Internal threads 39 and 40 respectively are now formed on the interior of the thickened ends 18 and 31 respectively. The increase in internal diameter of the thickened ends 18 over that shown in Fig. 12 where an elbow having internal threads is desired, is desirable in order that when a pipe and/or pipe fitting (not shown) is screwed into threads 39 and/or 40, the internal diameter of the tube 10 will be substantially equal to the internal diameter of the pipe or pipe fitting to be associated therewith.

There results from my improved method a pipe fitting such as an elbow of integral, wrought, homogeneous, preferably non-ferrous metal, such as copper, in which the main or body portion thereof has a wall thickness insufficient to bear threads and in which the thickened ends thereof are of sufficient thickness to bear either internal or external threads, and such elbow is produced with a minimum of operation.

Whereas I have described my invention by reference to specific forms thereof, it will be understood that many changes and modifications may be made without departing from the spirit of the invention.

I claim:

1. The improved method which comprises subjecting a cylindrical tube having a substantially uniform wall thickness throughout and of a magnitude insufficient to bear threads, to cold flow of the material under pressure to form a thickened portion at one end thereof having an outer diameter substantially equal to the outer diameter of the tube, then subjecting the unthickened end portion of said tube to cold flow of the material under pressure while positively supporting the whole of the body portion of the tube both exteriorly and interiorly between its said ends to produce a thickened portion at its said theretofore unthickened end having a diameter substantially equal to the outer diameter of the tube, passing the tube through a die to change its cylindrical contour to a non-cylindrical contour, and thereafter forming threads at such thickened end portions.

2. The improved method which comprises subjecting a cylindrical tube having a substantially uniform wall thickness throughout and of a magnitude insufficient to bear threads, to cold flow of the material under pressure to form a thickened portion at one end thereof having an outer diameter substantially equal to the outer diameter of the tube, then subjecting the unthickened end portion of said tube to cold flow of the material under pressure while positively supporting the whole of the body portion of the tube both exteriorly and interiorly between its said ends to produce a thickened portion at its said theretofore unthickened end having a diameter substantially equal to the outer diameter of the tube, passing the tube through a die to change its cylindrical contour to a non-cylindrical contour, expanding one or more of said thickened ends to have a diameter greater than the internal diameter of the body portion of the tube, and forming threads at such thickened ends.

EDWARD S. CORNELL, Jr.